United States Patent
Cook, III et al.

(10) Patent No.: US 7,424,736 B2
(45) Date of Patent: Sep. 9, 2008

(54) METHOD FOR ESTABLISHING DIRECTED CIRCUITS BETWEEN PARTIES WITH LIMITED MUTUAL TRUST

(75) Inventors: John L Cook, III, Southborough, MA (US); Clark W. Lefavour, Southborough, MA (US); Henry L. Steinberg, Westborough, MA (US); Malini K. Bhandaru, Subdury, MA (US); Rou Z. Lam, Nashua, NH (US)

(73) Assignee: ComBrio, Inc., Southborough, MA (US)

( * ) Notice: Subject to any disclaimer, the term of this patent is extended or adjusted under 35 U.S.C. 154(b) by 789 days.

(21) Appl. No.: 10/796,949

(22) Filed: Mar. 10, 2004

(65) Prior Publication Data

US 2005/0204160 A1    Sep. 15, 2005

(51) Int. Cl.
*G06F 17/00* (2006.01)
*H04L 9/00* (2006.01)

(52) U.S. Cl. ......................................... 726/11; 713/153
(58) Field of Classification Search ........................ None
See application file for complete search history.

(56) References Cited

U.S. PATENT DOCUMENTS

| | | |
|---|---|---|
| 5,592,621 A | 1/1997 | Rabinovich et al. |
| 5,802,309 A | 9/1998 | Cook et al. |
| 6,230,165 B1 | 5/2001 | Cook |
| 6,574,732 B1 | 6/2003 | Steinberg et al. |
| 6,757,714 B1 | 6/2004 | Hansen |
| 7,046,134 B2 | 5/2006 | Hansen |
| 7,082,460 B2 | 7/2006 | Hansen et al. |
| 7,117,239 B1 | 10/2006 | Hansen |
| 7,149,792 B1 | 12/2006 | Hansen et al. |
| 7,178,149 B2 | 2/2007 | Hansen |
| 7,185,014 B1 | 2/2007 | Hansen |
| 2002/0099937 A1* | 7/2002 | Tuomenoksa ............... 713/153 |
| 2002/0116550 A1 | 8/2002 | Hansen |
| 2004/0027376 A1 | 2/2004 | Calder et al. |
| 2004/0083382 A1* | 4/2004 | Markham et al. ........... 713/200 |
| 2004/0133563 A1 | 7/2004 | Harvey et al. |
| 2004/0177124 A1 | 9/2004 | Hansen |
| 2005/0021772 A1 | 1/2005 | Shedrinsky |

* cited by examiner

*Primary Examiner*—Nasser Moazzami
*Assistant Examiner*—Brandon S Hoffman
(74) *Attorney, Agent, or Firm*—Wilmer Cutler Pickering Hale & Dorr LLP

(57) ABSTRACT

Creating directed circuits including encoding of policy and state information associated with directed circuits that may be established between two network entities on separate protected networks. The policies are maintained and implemented according to security methods that initially belong to network apparatus on either of the two protected networks; however the security methods may be relinquished to trusted third parties.

28 Claims, 10 Drawing Sheets

```
204 ─┐
      <request
206 ─┐ version="r1.0.1">
      <tunnel
        serverAddress="<address>"
        clientAddress="<address>"
        protocol="<protocol>"
        ifName="<interface>"
208 ─┐ active="false">
      <directedCircuit
        expires="<minutes>"
        serverSideHostAddress="<address>"
        clientSideHostAddress="<address>"
        clientBound="false"
        requested="true"
        clientSideActive="false"
        serverSideActive="false"/>
      </tunnel>
      </request>
```

FIG 10C

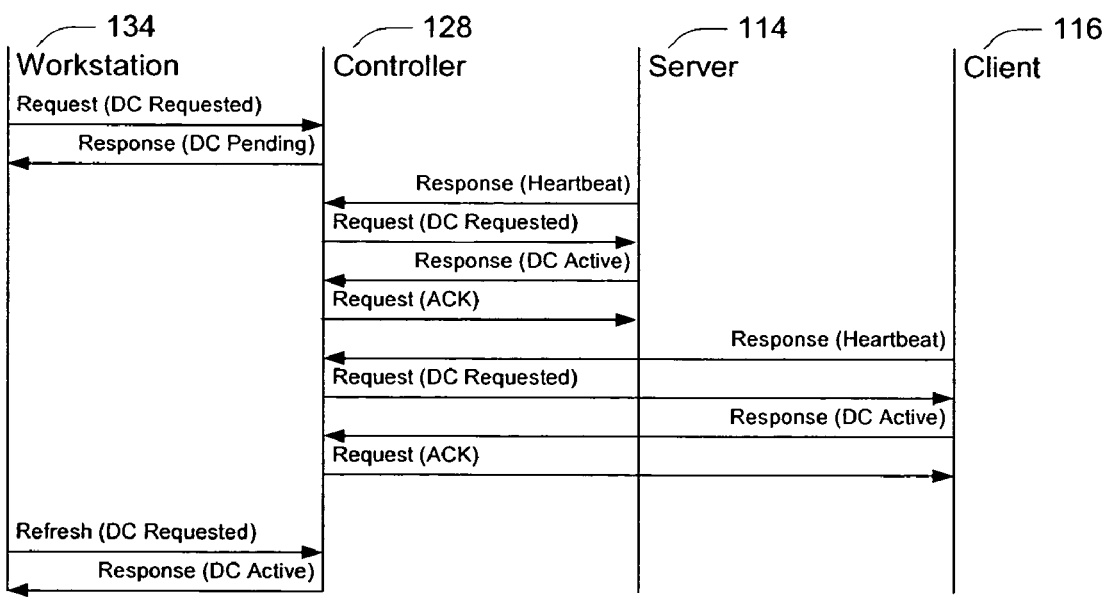

FIG 11

METHOD FOR ESTABLISHING DIRECTED CIRCUITS BETWEEN PARTIES WITH LIMITED MUTUAL TRUST

FIELD OF THE INVENTION

This invention relates to the field of computer networking, specifically to the establishment of secure connections between network entities on separate private networks.

BACKGROUND OF THE INVENTION

Businesses have a need for exchanging computer-based data with each other e.g., manufacturers need to order parts from suppliers vendors need the ability to maintain their products on customer networks, and management service providers need to maintain computing equipment on customer networks). Originally voice communications, facsimile, e-mail or direct contact was used to exchange such data. More recently, advanced network techniques have allowed parties to communicate more directly by dedicated computer networks, thereby eliminating more costly solutions.

The previously mentioned advanced networking techniques for business to business communications were achieved by establishing costly point to point private network links. Over time these point to point private networks have been displaced by more cost effective shared private networks. In many cases, shared private networks have been displaced by yet more cost effective virtual private networks over public networks.

As technology has moved business networking from private to shared private to virtual private networks, the reoccurring cost of the connection has decreased; however, new disadvantages have surfaced:
  (a) persistent virtual private network connections take up a great deal of network resources;
  (b) persistent virtual private network connections are subject to more security concerns than private networks;
  (c) configuration and maintenance of virtual private networks require a great deal of administration on both participating private networks;
  (d) outsourcing of virtual private network configuration and maintenance has excessive capital and operational expenses.

SUMMARY AND OBJECTS OF THE INVENTION

Several objects and advantage of the present invention are:
  (a) a method by which a directed circuit (leveraging a temporary virtual private network) may be established for exchange of application data between two network entities on separate private networks;
  (b) a method for actively managing and maintaining network apparatus on a private network via a network entity on a separate private network;
  (c) a method by which a directed circuit (in the absence of a virtual private network) may be established for passively monitoring network entities via network entities on a separate private network;
  (d) a method by which the establishing party of a temporary directed circuit may be authenticated and authorized;
  (e) a method by which the establishment of temporary directed circuits may be audited;
  (f) a method for expressing the rules associated with packet routing and network filtering on two separate private networks for the purpose of establishing directed circuits via more abstract policies;
  (g) a method of securely maintaining and implementing policies;
  (h) a method for implementing policies on either of the two private networks participating in the directed circuit;
  (i) a method for passing the ability to implement policies to a third party that may or may not diametrically participate in the directed circuit.

The present invention involves a private computer satellite network connected to a public computer network such as the Internet. The private computer satellite network can be the Local Area Network (LAN) of a business or organization. The satellite network is connected to the public network through a firewall. The local area network can have a plurality of network entities, such as personal computers and data servers/entities. The firewall is configured to allow the personal computers in the satellite network to send outgoing messages from the satellite network to the public network, and the firewall allows answer messages from the public network, which answer the outgoing messages, into the satellite network. In one particular embodiment the firewall allows the personal computers in the satellite network to access the World Wide Web through an HTTP connection protocol. This type of configuration for a firewall is very popular and accepted as being a minimal risk.

The present invention places a secure access appliance in the satellite network. This secure access appliance sends an outgoing message through the firewall, into the public network, and to a director, preferably a director computer network. An example of a director would be a vendor who is maintaining or servicing one of the data servers or personal computers in the satellite network. An example of an outgoing message would be a status message reporting on the status of the secure access appliance, and at least one of the personal computers or data servers in the satellite network. When the director needs access to the one data server in the satellite network, the director waits for the outgoing message from the secure access appliance. After the director receives the outgoing message, the director creates an answer message and sends the answer message back to the secure access appliance. The answer message includes data which asks the secure access appliance to create a tunnel connection, such as a carrier tunnel, with the director. Directed circuits are then created in the tunnel. Tunnel connections, carrier tunnels and directed tunnels are known in the art, and many different types of tunnel connections, carrier tunnels and directed circuits can be used with the present invention. Further description of the tunnelling technology is therefore not necessary to one of ordinary skill in the art.

Once the secure access appliance has created a secure tunnel with the director, the director can send instruction messages to the secure access appliance. These instruction messages can instruct the secure access appliance to communicate with the one data server inside the satellite network and what information to send to the data server/entity.

It is often preferred that the vendor servicing the one data server is not allowed to access information on other data servers or personal computers of the satellite network. Therefore the secure access appliance also has a network switch/router and a network filter to prevent the secure access appliance from communicating with forbidden network entities.

The secure access appliance is preferably installed with a set of rules of engagement which describe to who, and how, to communicate. These rules apply not only to how the secure access appliance communicates with other network entities in the satellite network, but also to whom, and how, the secure access appliance communicates through the firewall, through the public network, into the director network. These rules of engagement can be drawn up when the secure access appliance is installed. Therefore all, or at least most, changes to a satellite network for remote servicing can be incorporated into one network appliance in a secure manner. This provides for easy installation, and also secure communication. The operators and users of the satellite network do not need to worry about making a large number of changes to their network so that a vendor can service the network entities. The operators and users of the satellite network also do not need to worry that changes to parts of their satellite network for the secure communication could adversely affect other parts of the network and might make their satellite network less secure overall. This is especially true when several changes for different secure communication operations interfere with each other, and changes from obsolete or no longer needed secure communications are not completely removed.

The director network can also have a secure access appliance with rules of engagement. These rules of engagement would limit to who the director network could open a carrier tunnel with, and which of the personal computers in the director network could communicate with an open carrier tunnel. This then provides some protection for the director network from unauthorized entry, such as by messages posing as outgoing status messages from satellite networks.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

FIG. 10C is a text diagram depicting a typical XML request document used in requesting a change of state in a directed circuit by a controller with respect to appliance participating in the directed circuit;

FIG. 11 is event flow diagram depicting the establishment of a directed circuit in the presence of a suitable carrier tunnel established for another directed circuit;

DESCRIPTION OF THE PREFERRED EMBODIMENT

Figure 1:
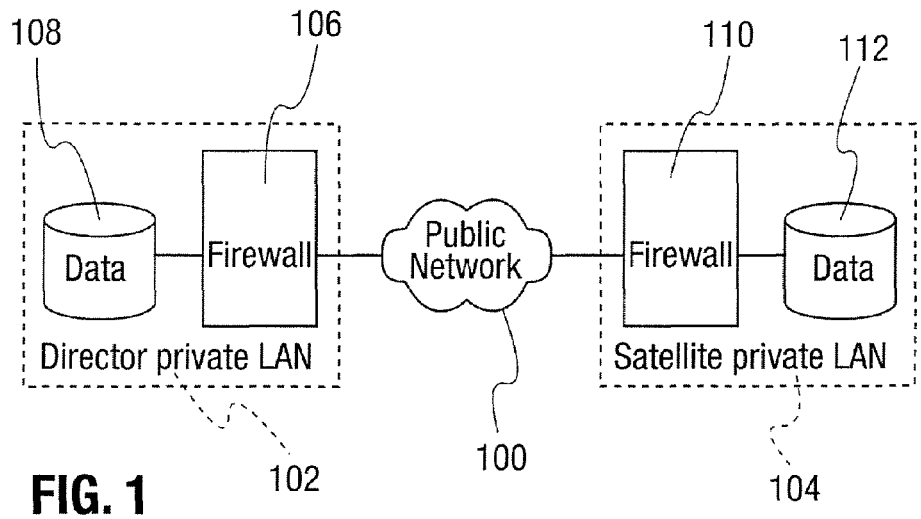
FIG. 1 is a schematic view of two private networks connected to a public network.

Referring to FIG. 1, two private networks 102, 104 access a public network 100. The first private or director network 102 uses a firewall 106 to allow a network entity 108 to freely initiate communications with other network entities accessed via the public network while blocking access to the entity 108 from the public network. The second or satellite private network 104 also uses a firewall 110 to allow a network entity 112 to freely access other network entities accessed via the public network while blocking access to the entity 112 from the public network. In this example, the network administrator of both private networks 102, 104 do not trust any third parties to access their protected network entities 108, 112. The firewalls are configured to allow through answer messages from the public network which are answers to outgoing messages originating from inside the satellite network.

Figure 2:
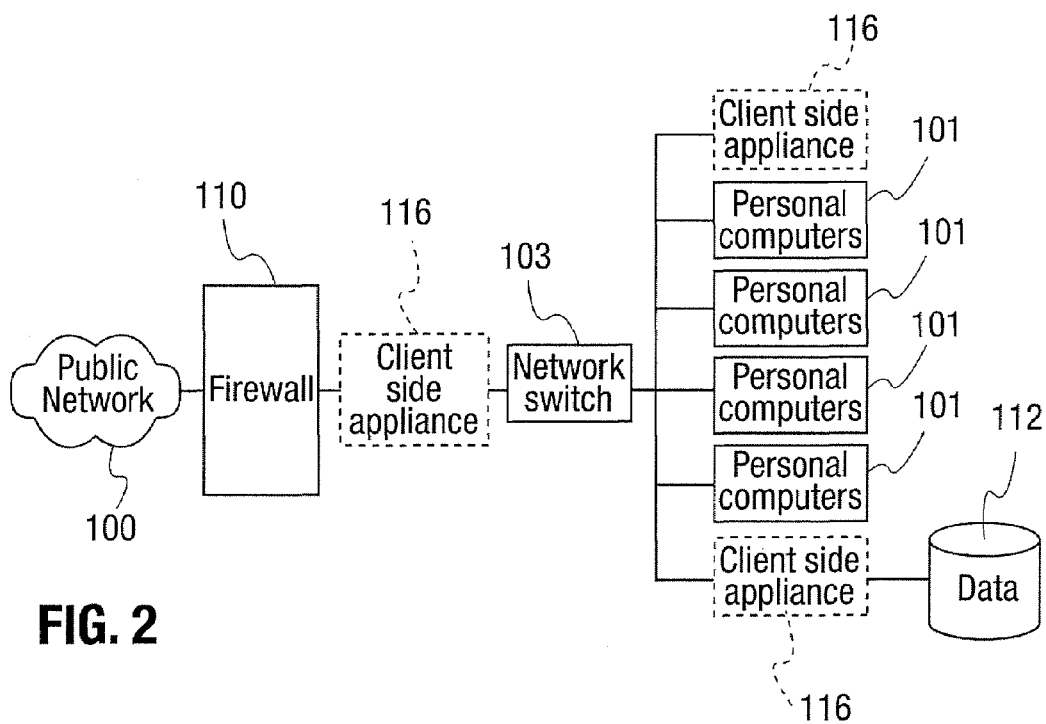
FIG. 2 is a schematic view of a satellite network with the secure access appliance installed.
Figure 3:
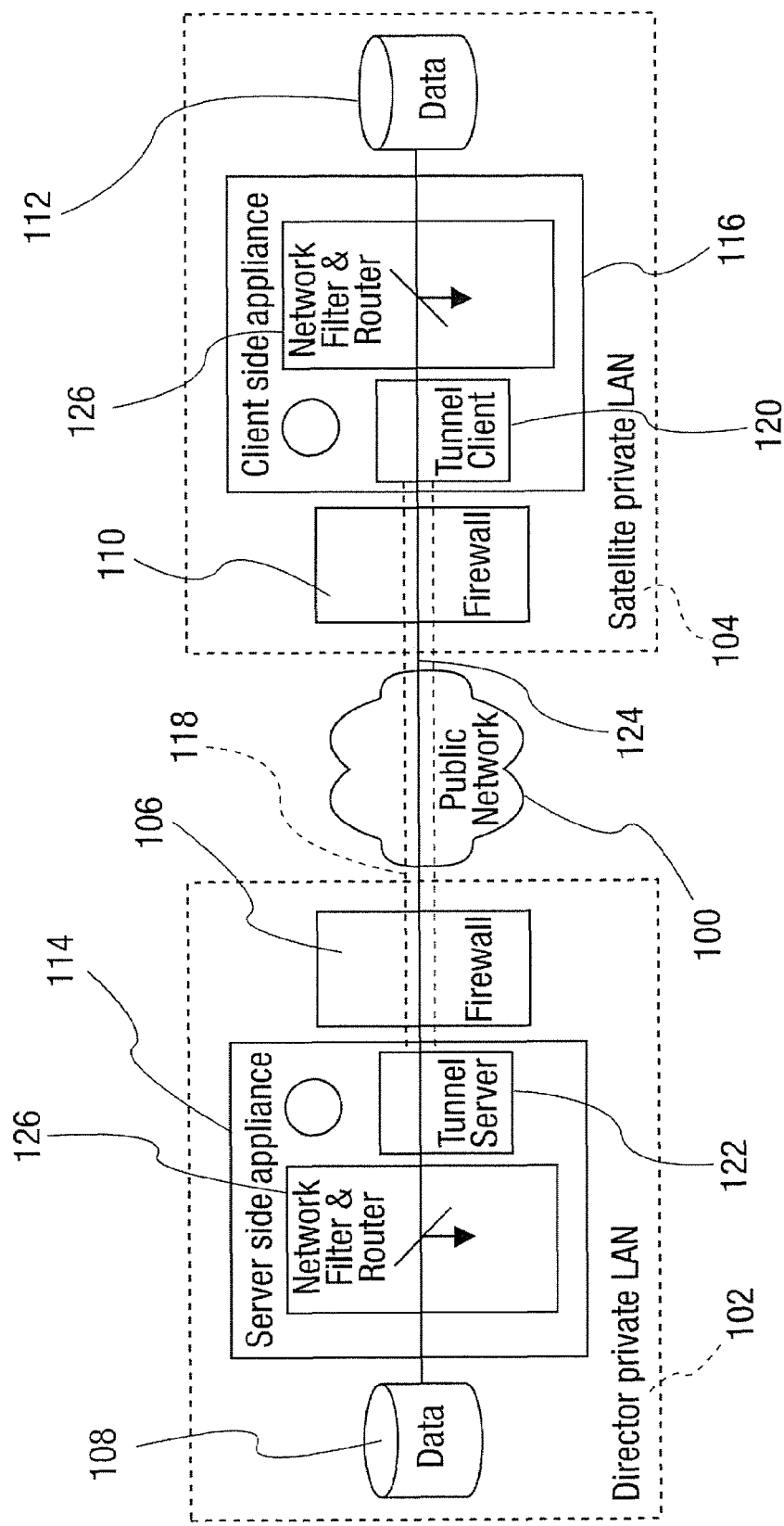
FIG. 3 is a schematic view of two applications on separate private networks exchanging data via a directed circuit according to the present invention.

While the network administrators in this example do not trust each other with full access to their respective network entities, from time to time, they may need to exchange data with each other. Referring to FIGS. 2 and 3, additional network apparatus in the form of secure network appliance 114, 116 with directed circuit devices may be added to each private network to allow this interaction to take place. In the first private network 102, the appliance 114 embodies a packet router, a net filter and a Virtual Private Network (VPN) server. In the second private network 104, the appliance 116 embodies a packet router, a net filter and a VPN client. Provided that the firewall in the first (director) network 106 is configured to allow the passing of VPN connections and that both of the appliances 114, 116 are correctly configured, a VPN session may be established between the two private networks 102, 104 allowing the two networks to be joined.

While adding the appliance 114, 116 to the solution provides the ability to temporarily join the two private networks 102, 104, either one or both network administrators may prefer to grant limited access to the other to carry out a more specific task. Since the appliances 114, 116 contain packet filtering and packet routing as well as VPN technology it is possible for previously agreed upon terms of engagement to be effected as policies. Policies may then equate to routing, filtering and VPN rules used to configure those software components in the appliances 114, 116. By using this technique, it is possible for one network entity 112 on the second private network to be granted access to one and only one network entity 108 on the first private network. This technique provides a very specific form of access that is palatable to both network administrators since it maps back to their terms of engagement.

FIG. 2 shows different embodiments of the satellite network 104. In these embodiments, the director network 102 needs to communicate with, or modify, the data entity 112. Messages are sent during normal operation of the satellite network, between the personal computers 101, the data entity 112, and the public network 100 through a switch 103. In one embodiment the secure access appliance 116 is a two port appliance and is placed between the switch 103 and the data entity 112. In another embodiment, it is possible for the two port secure access appliance 116 to be placed between the firewall 110 and the switch 103. It is still further possible for the secure access appliance to be a single port device, and only be connected to the switch 103.

When the secure access appliance 116 is placed between the switch 103 and the data entity 112, the secure access appliance 116 passes messages back and forth between the switch 103 and the data entity 112 normally. If secure access is desired, the secure access appliance 116 receives messages from the director network 102 and forwards these messages to the data entity 112. If secure access is not desired, the secure access appliance 116 only passes normal messages back and forth.

If the secure access appliance 116 is a single port appliance, the secure access appliance 116 is passive when secure access is not required. When secure access is required, the secure access appliance 116 receives messages from the director network 102, and then the secure access appliance 116 forwards those messages to the data entity 112 and only to the data entity 112.

When the two port secure access device 116 is arranged between the firewall 110 and the switch 103, the secure access device passes all the normal traffic between the firewall 110 and the switch 103. When secure access is required, the secure access appliance 116 receives messages from the director network 102 via the VPN, and then the secure access appliance 116 forwards those messages to the data entity 112 and only to the data entity 112.

The secure access appliance 116 contains structure that sets up the tunnel with the director network 102, and also limits the secure access appliance 116 to only communicate with the director network 102 and the data entity 112 via the VPN. The packet router, net filter and VPN server of the secure access appliance 116 create the tunnel, the directed circuits, and limits the secure access appliance 116 to only communicate with permitted network entities. The secure access appliance 116 contains rules of engagement that are agreed upon ahead of time with the operators of the director and satellite networks 102 and 104. These rules of engagement are then used to properly configure the secure access appliance.

While many features of the present invention can be created with a similar set of separate or existing routers, firewalls and VPN hardware on each of the private networks, such a solution requires potentially greater capital expense since more equipment is involved and certainly greater operational expense to configure and maintain the more abstract notion of policy in the form of specific configuration rules on multiple pieces of network apparatus. Thus one of the markedly distinguishing capabilities of the present invention is in the ability for the appliances 114, 116 to effect policies in an automated fashion.

Traditional VPN deployments consist of a VPN server and multiple VPN clients. In such cases, the VPN server is typically realized as a piece of hardware or software running on a server within a network that end users need to access. Furthermore, the VPN client is typically a software application on the end-user's system which allows the end-user to access entities on the private network served by the VPN server.

The present invention utilizes network tunneling technology in a unique way. First, the traditional VPN model is reversed in that the protected network utilizes the client. Second, unlike the traditional VPN model, the client has the potential to represent multiple participating entities in that it resides in an independent network device. Finally, rather than being the typical point to point service, in the present invention, the tunnel serves as a carrier for a plurality of directed circuits.

Although traditional VPN technologies such as Point to Point Tunneling Protocol and IPSEC may be leveraged to form the carrier tunnel, essentially any tunneling technology may be used with respect to the present invention including proprietary methods. This is due to the fact that the carrier tunnel is part of a closed solution not intended to extend or leverage existing VPN deployments in any way. There are many different types of tunneling and many different ways of implementing tunneling and it is the notion of the carrier tunnel that is germane to the present invention. The actual tunneling technology utilized is left up to the person skilled in the art.

Referring to FIG. 3, as noted above, the appliance 114 in the director network contains a tunnel server 122. The appliance 116 on the second (satellite) network contains a tunnel client 120. At this level, there is the potential for a carrier tunnel 118 to be established between the two appliances over the public network 100. By introducing a network filter and packet router 126 on each appliance 114, 116 it is possible to effect a directed circuit 124 that further refines the constraints of the tunnel 118 to suit the requirements of previously agreed upon previously established policies of engagement.

Figure 4:
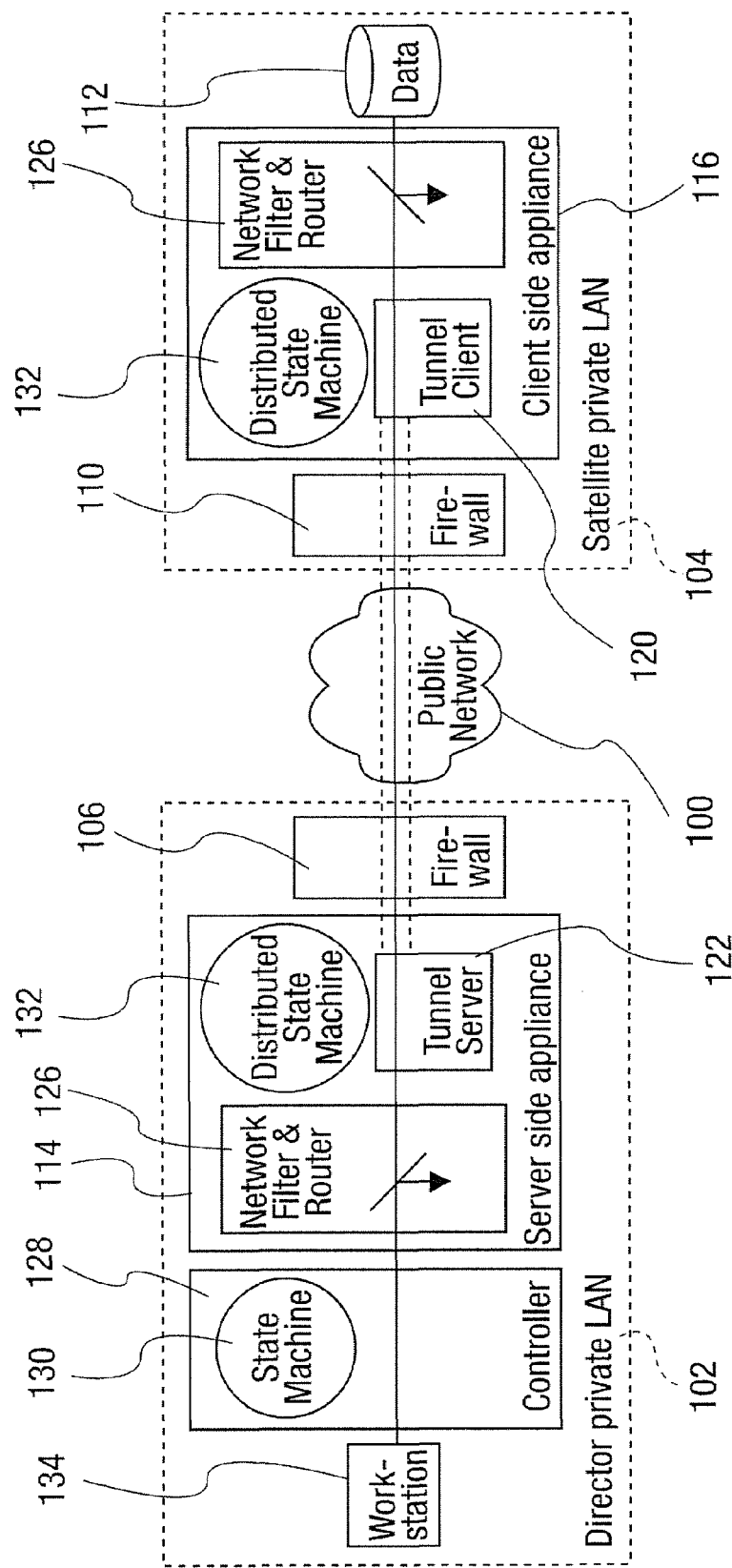
FIG. 4 is a schematic view of an active directed circuit established to actively manage an application on a private network.

Referring to FIG. 4, the establishment of directed circuits 124 and the sympathetic implementation of carrier tunnels 118 must be coordinated between two appliances. Much of this coordination is instigated by an additional component of the present invention referred to as a controller. The controller 128 is responsible for translating previously established policies of engagement into events that drive its internal state machine 130. Ultimately, changes within the controller's state machine 130 are translated into requests which are communicated to the appliances 114, 116 to effect changes in their respective distributed state machines components 132.

Figure 5:
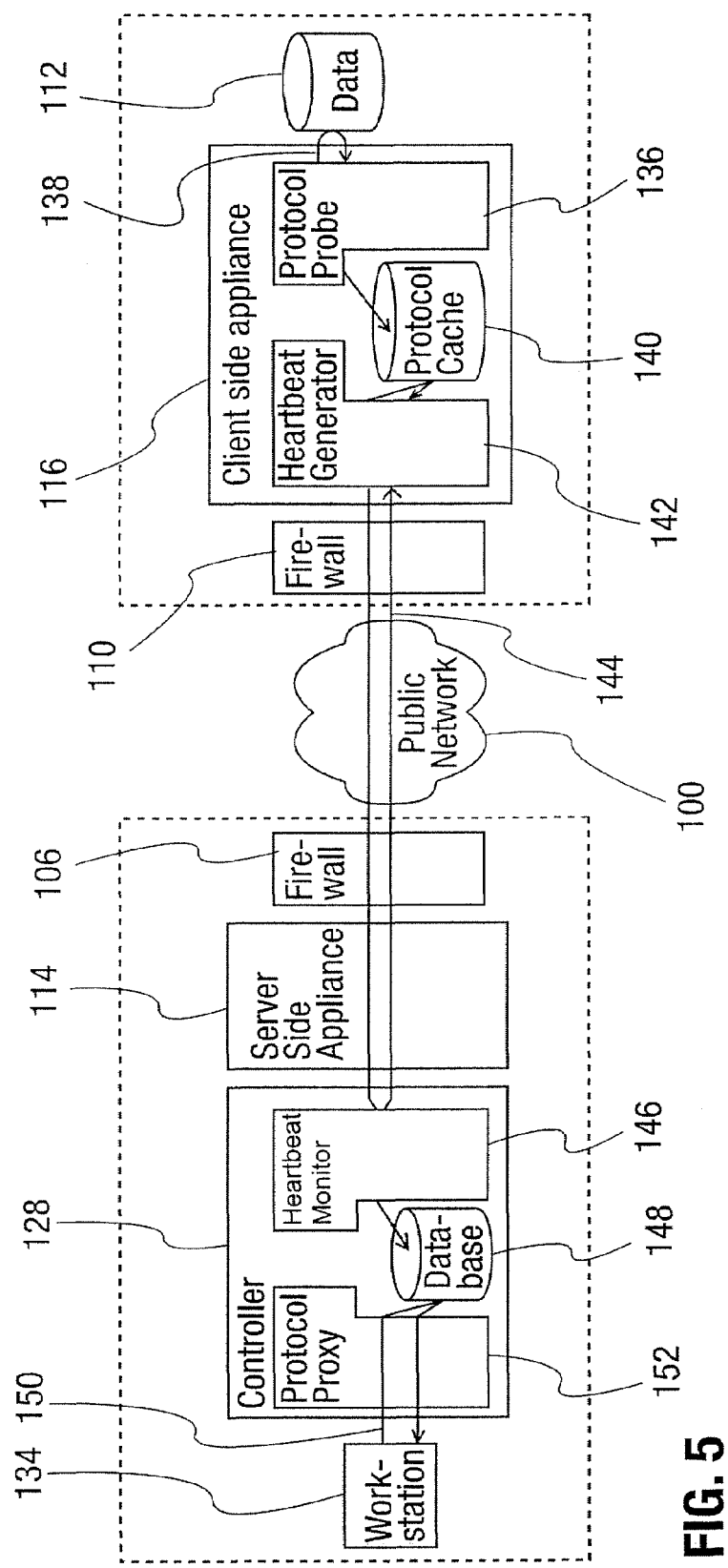
FIG. 5 is a schematic view of a passive directed circuit established to passively monitor an application on a private network.

Referring to FIG. 5, before a directed circuit is established between two appliances, it would be beneficial for the controller 128 to be aware of the status of potential candidate network entities 112 for directed circuits. A special status or heartbeat message protocol is used to this end. In addition, to providing status information about the appliance 116 itself, an outgoing status or heartbeat message may also be used to convey information about entities 112 on the satellite network.

A protocol probe 136 on the remote appliance 116 will periodically send protocol requests 138 to a network entity 112. Information collected by the probe will be stored in a protocol cache 140. On a periodic basis, the heartbeat generator 142 will collect information about the state of the appliance 116 and information from the protocol cache 140 to build a heartbeat response. This response is an XML document that is transferred to the heartbeat monitor application 146 within the controller 128 via the HTTP protocol. The heartbeat monitor application 146 is then able to update the controller's database 148 with current information about the status of the remote application 116 and the remote network entity 112. Subsequently, an end-user of the controller 128 may use a workstation 134 to access information from a remote network management proxy 152 on the controller 128 via a protocol request 150.

Figure 6:
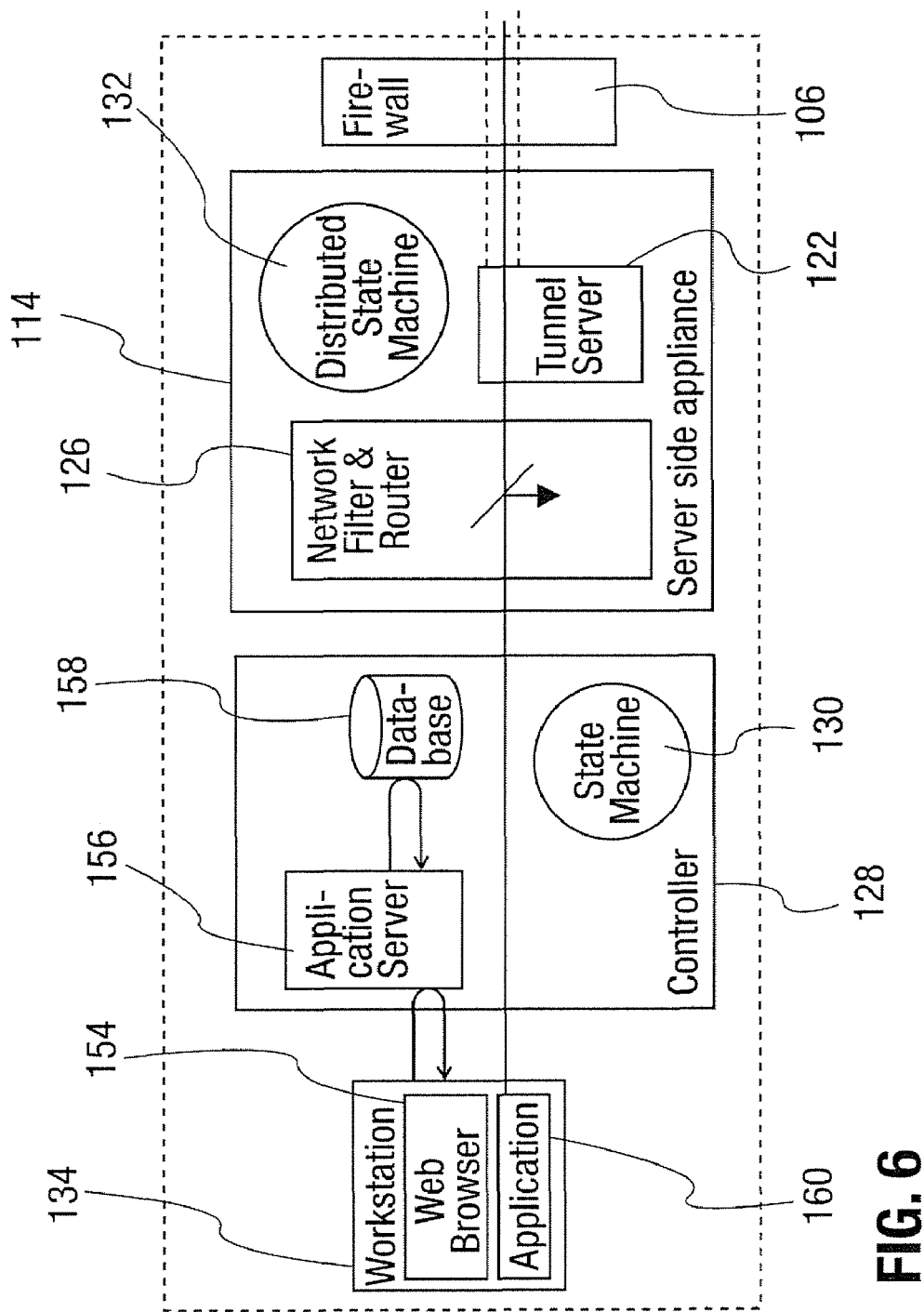
FIG. 6 is a schematic view depicting users of a management workstation authenticating and authorizing them with the present invention.

Referring to FIG. 6, since controller 128 offers the ability for an end-user to access potentially sensitive information about a remote network via their workstation 134, it is prudent that end-users are required to authenticate themselves with the controller 128 and authorize their level of access. When end-users seek to use a workstation 134 to access the facilities of controller 128 and/or a local appliance 114, they must first authenticate themselves via a user authentication application 156 on the controller 128. The user authentication application 156 may then validate the user's credentials via a user authentication database maintained within the controller 158 (within here may also refer to symbolically within as in the case of a RADIUS server). Once the user is authenticated their level of authorization may also be established from previously defined rules of engagement. The end-user's controller session, the network address of the workstation 134 and any directed circuits may then be associated with each other and tracked for the duration of the end-user session without requiring additional authentication.

Figure 7:
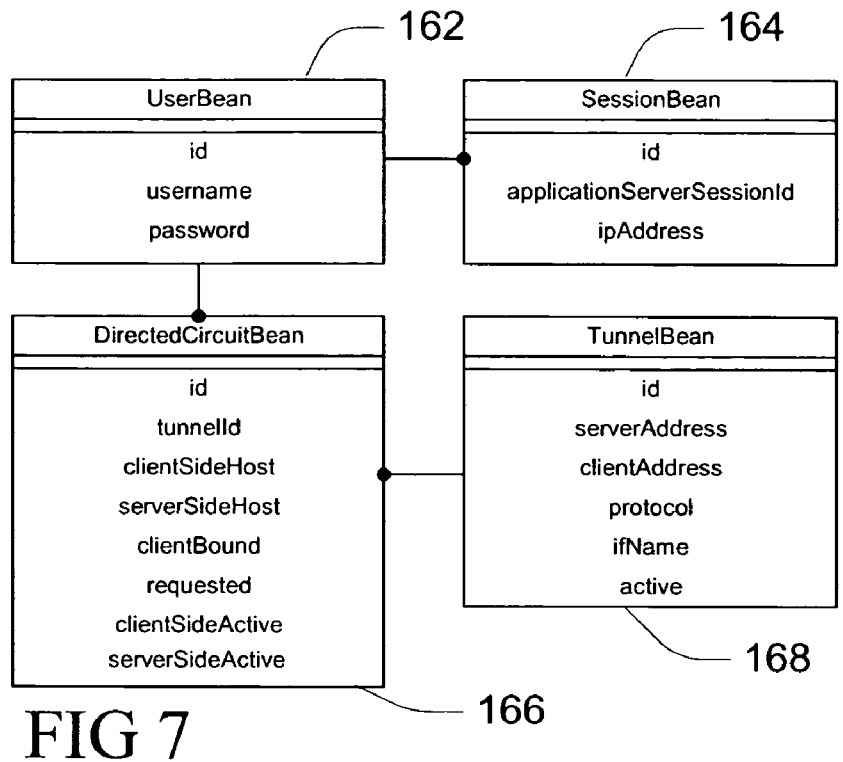
FIG. 7 is a block diagram depicting authentication and authorization objects and their relationships using the unified object-oriented methodology notation.

Referring to FIG. 7, several objects are used within the controller to track end-user authentication. The UserBean 162 represents an end-user with rights on the controller. Each user may have many sessions with the controller with the potential of accessing the controller from multiple workstations at the same moment. Each of these sessions is tracked by a SessionBean 164, which associates the session with the IP address of the workstation and the UserBean 162. Each directed circuit is represented by a DirectedCircuitBean 166. Each user may have many directed circuits. A session and/or a workstation's access to a given directed circuit is determined by the relationship of a UserBean 162 to its relationship with many SessionBeans 164 and many DirectedCircuitBeans 166. Each carrier tunnel is tracked by a TunnelBean 168. Each TunnelBean 168 is associated with many DirectedCircuitBeans 166 and each DirectedCircuitBean is associated with one TunnelBean 168. Via these relationships directed circuits and their carrier tunnels are related back to the workstations used by them.

Figure 8A:
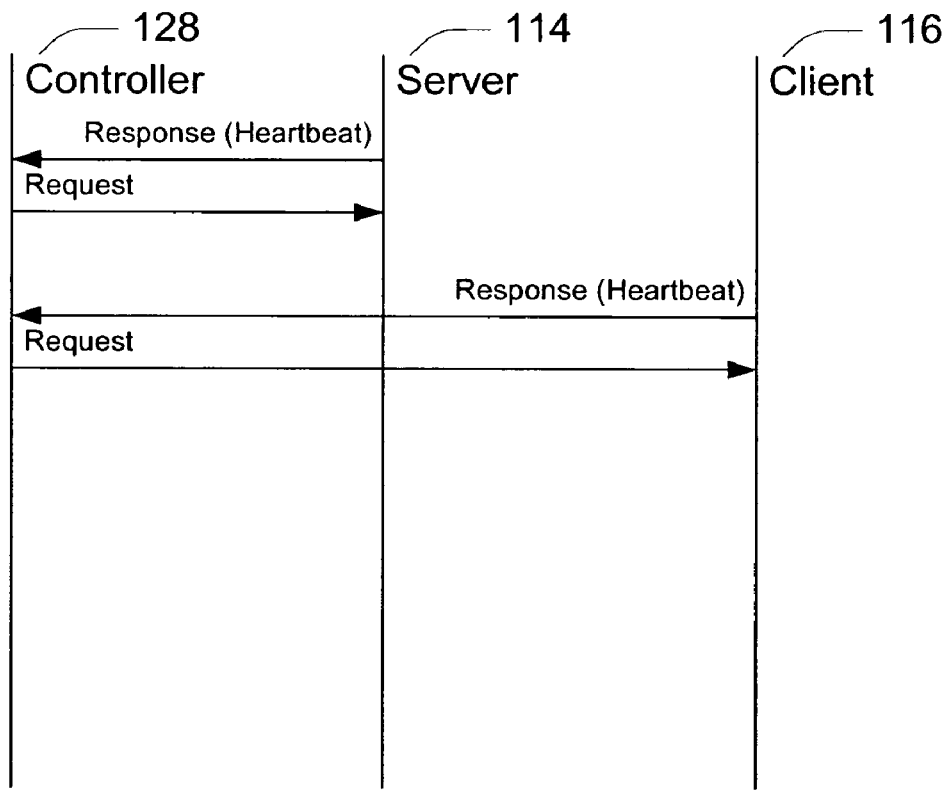
FIG. 8A is event flow diagram demonstrating the exchange of response and request information between an appliance and a controller according to the present invention.

The controller must have a local appliance to participate in directed circuits. Since this appliance will typically listen for incoming tunnel requests, we refer to it as the server appliance. Referring to FIG. 8A, both the server appliance 114 and the client appliance 116 send heartbeat messages to the controller 128 on a periodic basis. Upon receipt of the heartbeat message, the controller 128 will respond with a request message.

Figures 8B, 9:
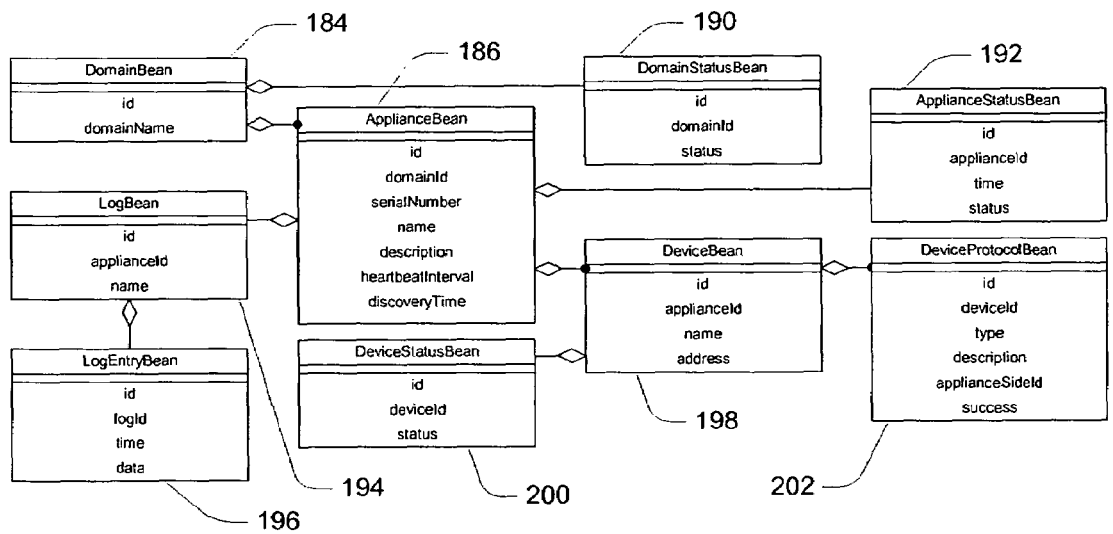
FIG. 8B is a text diagram demonstrating a typical XML response document used for communicating state and status by an appliance to a controller according to the present invention.
FIG. 9 is a block diagram depicting configuration and status objects for domain appliances and passively monitored devices and their relationships using the unified object-oriented methodology notation.

Referring to FIG. 8B, the heartbeat response is represented by an XML document. This document consists of a single response element 170. The response element 170 consists of a single domain element 172 which describes the domain or the network associated with the appliance sending the message. The domain element contains a single appliance element 174 and multiple device elements 180. The appliance element 174 describes the appliance itself and may include a logs element 176 with many log entry elements 178. The device element 180 describes a network entity that might participate in a directed circuit. A device element 180 may contain many protocol elements 182 which describe the state discovered by a protocol probe that may be of interest to an end-user in determining whether or not to establish a directed circuit to that entity.

Referring to FIG. 9, several objects are used by appliances and the controller to represent the aforementioned response elements within their respective database and distributed state-machine components. The DomainBean 184 describes a domain and serves as an aggregation point for a single DomainStatusBean 190 and many ApplianceBeans 186. While in the response protocol only one appliance is preferably associated with a given domain, a controller may associate many appliances with a given domain. The ApplianceBean 186 is an aggregation point for one ApplianceStatusBean 192, many LogBeans 194 and many DeviceBeans 198. The LogBean 194 is an aggregation point to many LogEntryBeans 196 which describe deltas to log entries on the appliance. The DeviceBean 198 describes a device that may potentially participate as a network entity in a directed circuit and serves as an aggregation point for a single DeviceStatusBean 200 and many DeviceProtocolBeans 202. The DeviceProtocolBean describes the state of a particular protocol associated with the given device.

Figure 10A:
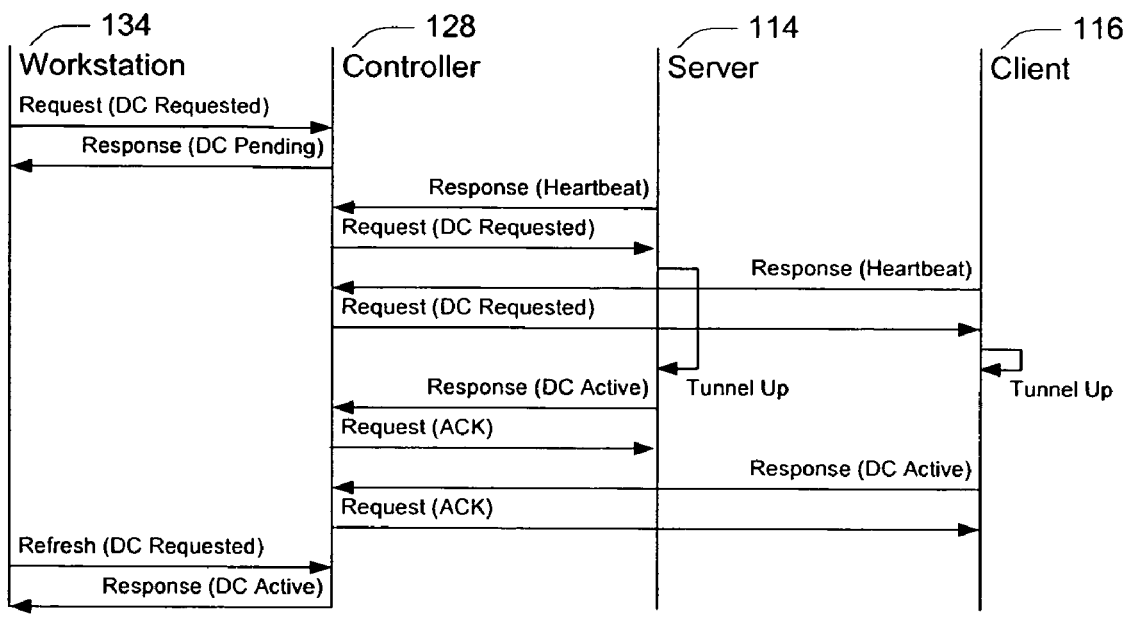
FIG. 10A is event flow diagram depicting the establishment of a directed circuit and its sympathetic carrier tunnel in the case where the server (listening) appliance is the first to send a response.

In a typical deployment end-users would not directly manipulate the controller; however, they would use a workstation running an application that interfaces with the controller. While it is not critical to the disclosure of the present invention, one might envision the end-user operating a WEB browser on their workstation that in turn is accessing a WEB interface on the controller. Referring to FIG. 10A, the workstation 134 would be able to request a directed circuit via the controller 128 interface. Once the directed circuit has been requested, subsequent outgoing status or heartbeat messages from the server 114 and client 116 appliances may be used to indicate that a directed circuit should be established. One of two scenarios may occur: server first or client first.

FIG. 10A shows the flow of data when the server appliance is the first to send a heartbeat after a directed circuit has been requested by the workstation to the controller 128. In this case, the server 114 sends a heartbeat and receives a request to start a directed circuit 124. This will put into effect the following chain of events on the server 114:

Internal database is updated.
Rules are applied to the net filter of the server 114 allowing the client/(secure access appliance) 116 at hand permission to establish a carrier tunnel 118.
Wait for the tunnel 118 to be established by the client 116.
Apply rules to the net filter allowing the carrier tunnel 118 to access the server side device 108 associated with the directed circuit 124.
Send a new heartbeat from the server 114 to the controller indicating that the directed circuit 124 has been established.

Next the client 116 sends its heartbeat and receives a request to establish a directed circuit 124. This will put into effect the following chain of events on the client 116:

Internal database is updated.
Rules are applied to the net filter of the client 116 allowing the server 114 at hand permission to establish a carrier tunnel 118.
Initiate a carrier tunnel 118 with the server 114.
Tunnel 118 will be established immediately.
Apply rules to the net filter allowing the carrier tunnel 118 to access the client side device 112 associated with the directed circuit 124.
Send a new heartbeat from the client 116 to the server 114 indicating that the directed circuit 124 has been established.

Figure 10B:
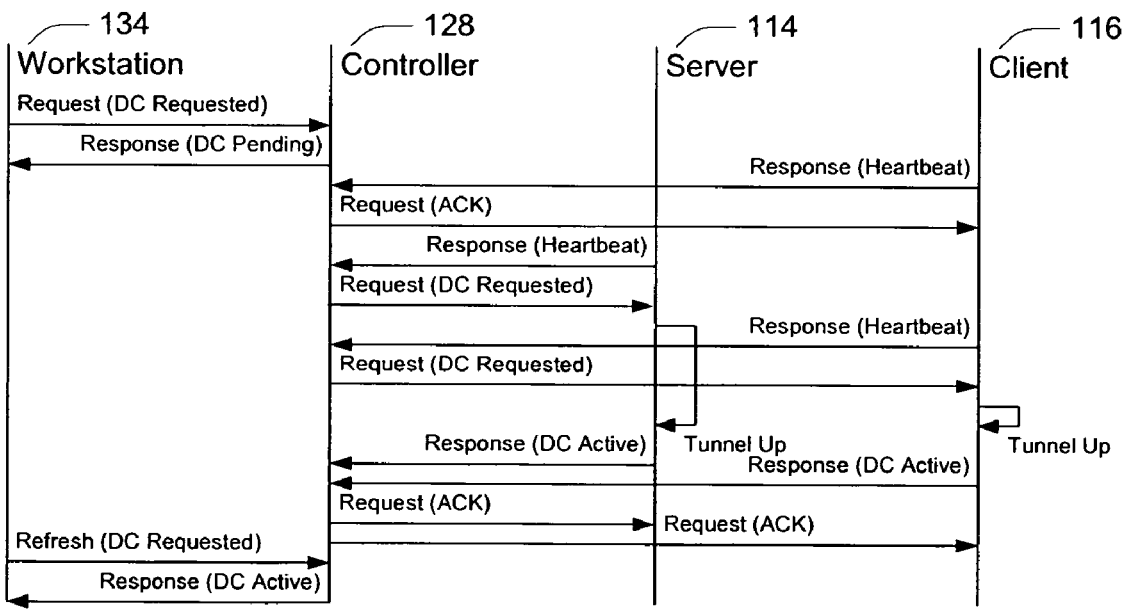
FIG. 10B is event flow diagram depicting the establishment of a directed circuit and its sympathetic carrier tunnel in the case where the client (connecting) appliance is the first to send a response.

FIG. 10B shows the flow of data when the client secure access appliance 116 is the first to send a heartbeat after a directed circuit 124 has been requested by the workstation. In this case, the chain of events on the server 114 will be the same as above; however on the client side, the client 116 sends a second heartbeat and then receives its request to establish a directed circuit 124. This will put into effect the following chain of events on the client 116:

Internal database is updated.
Rules are applied to the net filter allowing the server 114 at hand permission to establish a carrier tunnel 118.
Initiate a carrier tunnel 118 with the server 114.
Wait for the tunnel 118 to be established which will take some time.
Apply rules to the net filter allowing the carrier tunnel 118 to access the client side device 112 associated with the directed circuit 124.
Send a new heartbeat from the client 116 to the controller indicating that the directed circuit 124 has been established.

Referring to FIG. 10C the request message 204 (which is sent to both the server and client, in response to a heartbeat) contains tunnel elements 206. Each tunnel element may contain one or more directedCircuit elements 208. The tunnel element 206 describes the parameters required to establish a carrier tunnel between the client and server. The directedCircuit element 208 contains additional parameters required to limit communications over that tunnel between a specific server side host and client side host. The same tunnel 206 and directedCircuit 208 elements will also be used in a heartbeat response to describe the current state of a pending directed circuit.

Again referring to FIG. 7, two additional objects are used within the controller 128 and the client 116 and server appliances 114 to track the state of pending and active tunnels 118 and directed circuits 124. The TunnelBean 166 represents a pending or active tunnel 118. Each tunnel 118 may have many pending or active directed circuits 124 associated with it. The DirectedCircuitBean 168 is used to track the state of pending and active directed circuits 124.

Referring to FIG. 11, besides establishing a directed circuit between a client 116 and server 114 in the absence of a carrier tunnel 118 (as previously discussed), there is also the opportunity for a directed circuit 124 to be established that is able to leverage a previously established carrier tunnel 116. As may be expected, this case is easier for both the client 116 and the server 114. In fact, in this case, it does not matter which of the client 116 and server 114 sends the heartbeat first, and in both cases, the actions are the same:

Internal database is updated.
Apply new rules to the net filter allowing the existing carrier tunnel 118 to access the local device 112 associated with the directed circuit 124.
Send a new heartbeat to the controller indicating that the directed circuit 124 has been established.

Figure 12A:
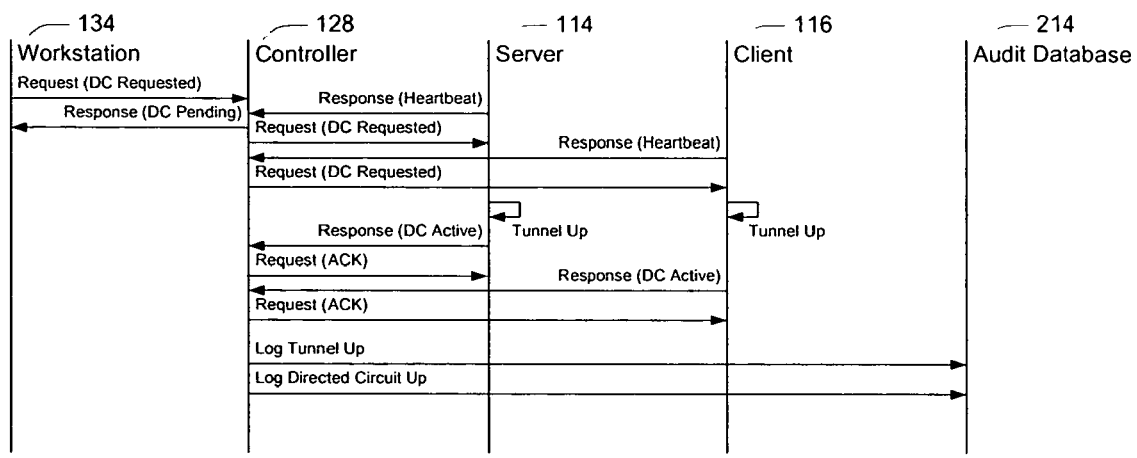
FIG. 12A is event flow diagram depicting the sending of messages to an audit database as a result of establishing a directed circuit and/or its sympathetic carrier tunnel.

Referring to FIG. 12A it is possible for an additional network server referred to as an audit database 214 to be utilized in the logging of carrier tunnel and directed circuit events. Once the standard procedures for establishing carrier tunnels (as outlined above) have been completed and the controller 128 has been notified via heartbeats from both client 116 and server 114 that the tunnel has been established, the controller 128 will log a tunnel up event to the audit database 214. Furthermore, once the standard procedure for establishing a directed circuit over a carrier tunnel (as outlined above) has been completed and the controller 128 has been notified via heartbeats from both client 116 and server 114 that the directed circuit has been established, the controller 128 will log a directed circuit up event to the audit database 214.

Figure 12B:
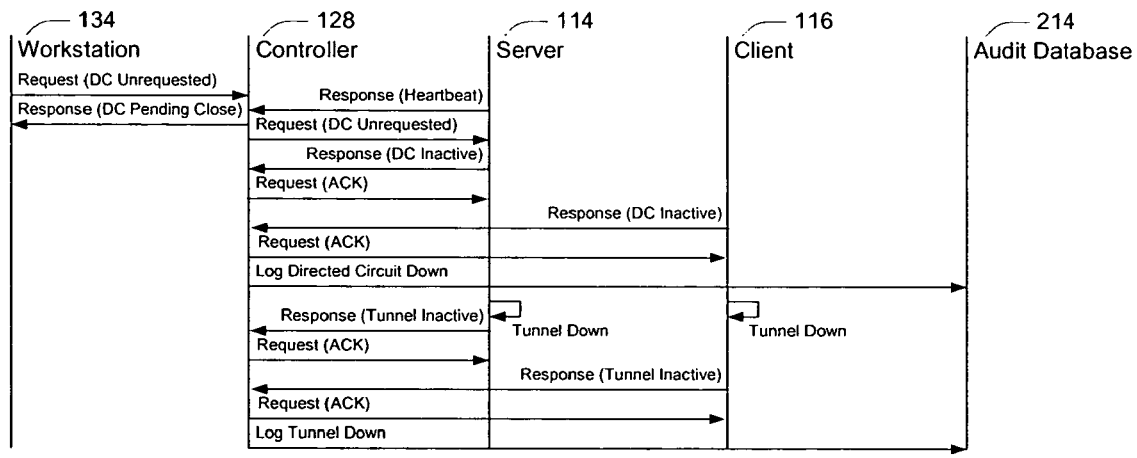
FIG. 12B is event flow diagram depicting the sending of messages to an audit database as a result of terminating a directed circuit and/or its sympathetic carrier tunnel.

Referring to FIG. 12B client 116 and server 114 appliance continue to send heartbeats to the controller 128 while carrier tunnels and directed circuits are established. Requests to bring down a directed circuit are delivered in this way. On either the client or the server, when a request is received to bring a directed circuit down, the following chain of events is initiated:

Internal database is updated.
Rules are applied to the net filter blocking interaction between the carrier tunnel and the local host associated with the directed circuit.
Send a new heartbeat indicating that the directed circuit has been closed.
Once the controller 128 has been notified by both the client 116 and server 114 that a directed circuit has been closed, the controller 128 will send a log directed circuit down message to the audit database 214.

When the last directed circuit associated with a carrier tunnel is closed on either the client 116 or the server 114, the following chain of events is put into motion:

Initiate closing of the carrier tunnel.
Wait for the carrier tunnel to close.
Delete previously established rules in the net filter which allowed the client to originally establishing a new tunnel to the server.
Send a new heartbeat indicating that the carrier tunnel has been closed.
Once the controller 128 has been notified by both the client 116 and server 114 that a carrier tunnel has been closed, the control 128 will send a log tunnel down message to the audit database 214.

While specific embodiments of the invention have been shown and described in detail to illustrate the application of the principles of the invention, it will be understood that the invention may be embodied otherwise without departing from such principles.

REFERENCE NUMERALS IN DRAWINGS

100—Public Wide Area Network (WAN)
101—Personal computers in the satellite network
102—First (director) private Local Area Network (LAN)
103—Network switch in the satellite network
104—Second (satellite) private Local Area Network (LAN)
106—Firewall protecting director LAN
108—Application on director LAN
110—Firewall protecting second LAN
112—Application on second LAN
114—Server side appliance on director LAN.
116—Client side appliance on satellite LAN.
118—Carrier Tunnel
120—Tunnel Client
122—Tunnel Server
124—Directed Circuit
126—Network Filter & Router
128—Controller
130—State Machine
132—Distributed State Machine component.
134—Workstation
136—Protocol Probe
138—Protocol Request/Response
140—Protocol Cache
142—Heartbeat Generator
144—Heartbeat Response/Request 146—Protocol Filter
148—Database
150—Protocol Request/Response
152—Protocol Proxy
154—Web Browser
156—Application Server
158—Database
160—Other Application
162—UserBean—represents user record in database.
164—SessionBean—represents user session in the database.
166—DirectedCircuitBean—represents directed circuit in the database.
168—TunnelBean—represents the carrier tunnel in the database.
170—response element—body of the response packet
172—domain element—describes the domain.
174—appliance element—describes the appliance
176—logs element—contains log entries of the appliance
178—logEntry element—describes a delta of the log
180—device element—describes a device in the domain
182—protocol element—describes the results of a protocol probe.
184—DomainBean—represents a domain in the database.
186—ApplianceBean—represents an appliance in the database.
190—DomainStatusBean—represents the status of a domain.
192—ApplianceStatusBean—represents the status of an appliance.
194—LogBean—represents a log of an appliance in the database.
196—LogEntryBean—represents an entry in an appliance log.
198—DeviceBean—represents a device in the database.
200—DeviceStatusBean—represents the status of a device.
202—DeviceProtocolBean—represents a protocol probe.
204—request element—body of the request packet
206—tunnel element—describe attributes of the carrier tunnel.
208—directed circuit element—describes attributes of the DC.
210—TunnelBean—represents the attributes of a carrier tunnel.
212—DirectedCircuitBean—represents the attributes of a DC.

What is claimed is:

1. A method for communicating between a first private computer network and a second private computer network via a public network, the method comprising:
   in the first private network having a plurality of devices, a secure access appliance associated with the plurality of devices, and a firewall between the devices and the public network, the secure access appliance receiving status information from the plurality of devices;
   the secure access appliance sending a periodic outgoing message including at least one message with information relating to the status of at least one of the devices, wherein the periodic outgoing message is directed to the second private network through the firewall and via the public network;
   receiving through the firewall a request message from the second private network responsive to one of the periodic outgoing messages, the request message requesting that the secure access appliance open a tunnel through the firewall, wherein the firewall allows the request message in response to one of the periodic outgoing messages but otherwise restricts the second private network from accessing the first private network without a tunnel;
   the secure access appliance opening a tunnel through the firewall in response to the request message to allow access; and
   one or more of the plurality of devices in the first private network receiving instruction messages from the second private network, the instructions being received through the tunnel;
   wherein the instruction messages are received for a limited period of time and are received to actively manage the one or more devices.

2. The method of claim 1, wherein the appliance maintains information indicating which devices the second network is allowed to interact with through a tunnel, and wherein the second network is not allowed to interact through a tunnel with some devices.

3. The method of claim 1, wherein the first network receives instruction messages for one device, and wherein the appliance has a filter for limiting access to one and only one device.

4. The method of claim 1, wherein the first network receives instruction messages for a plurality of devices, and wherein the appliance has a filter for limiting access to a plurality of specified devices.

5. The method of claim 1, wherein the appliance includes a virtual private network client.

6. The method of claim 1, further comprising logging information related to tunnel openings.

7. The method of claim 1, further comprising continuing to send periodic messages while a tunnel is open.

8. The method of claim 1, further comprising, after a tunnel is closed, including information about the tunnel closing in a subsequent one of the periodic messages.

9. The method of claim 1, wherein the devices include computers.

10. The method of claim 1, wherein the public network is the Internet, the periodic outgoing messages and request message being sent and received via HTTP.

11. A method for a private director network to interact with one or more devices on a first private network via a public network, wherein the networks have firewalls and limited mutual trust, the method comprising:
    the director network receiving periodic messages from the first private network via the public network, the periodic messages including status information about a device on the first private network;
    the director network sending a request message to the first private network in response to one of the periodic messages, the request message requesting that the first private network open a tunnel through a firewall in the first private network, the request message including information for indicating to a firewall at the first private network that the request message is in response to one of the periodic messages so that the firewall will not block the request message; and
    after a tunnel is opened, the director network sending information through the tunnel to actively control the device by exchanging application data with the device, the information being sent during a limited period of time after which the tunnel closes.

12. The method of claim 11, wherein the director network also interacts with one or more devices on a second private network.

13. The method of claim 11, wherein the director network sends information through the tunnel to actively control a plurality of devices on the first private network.

14. The method of claim 13, further comprising maintaining in memory in the director network status information about the devices on the first private network.

15. The method of claim 11, wherein a device on the first private network includes sending information from a workstation, the director network authenticating the user prior to sending information through the tunnel to actively control the device.

16. The method of claim 11, wherein the director network sends information through a secure appliance that includes a virtual private network client.

17. The method of claim 11, wherein the public network is the Internet, the periodic messages and request messages being sent and received via HTTP.

18. A system for securely communicating between a first private network and a second private network through a public network to enable the second private network to interact with one or more devices on the first private network, the first network including a firewall and having at least one device, the system comprising:
  a secure access appliance in the first private network for sending an outgoing message through the firewall to the second network via the public network, wherein the outgoing message is a status message sent periodically from the first private network through the firewall to the public network, the outgoing message at least in some instances including status information relating to the device;
  the secure access appliance including a tunnel client for opening a tunnel in the firewall responsive to a request message from the second network requesting that the secure access appliance open a tunnel through the firewall, the request message being received from the firewall and not through a persistent virtual private network with the second private network;
  the secure access appliance having interfaces to cause communications received from the second private network to be provided to the device for providing active control of the device for a limited period of time.

19. The system of claim 18, wherein the appliance maintains information indicating which devices the second network is allowed to access with a tunnel, and wherein the second network is not allowed to access at least some devices on the first private network.

20. The system of claim 18, wherein the first private network is operatively coupled to multiple devices and receives instruction messages for a plurality of devices.

21. The system of claim 18, wherein the appliance includes a virtual private network client.

22. The system of claim 18, further comprising memory for storing logging information related to tunnel openings.

23. The system of claim 18, wherein the appliance has a filter allowing the second private network to access one and only one device.

24. The system of claim 18, wherein the outgoing messages and request messages are sent and received via HTTP.

25. A system including a network for securely interacting with a device on a remote and non-trusting private network, the system communicating with the private network and the device through a firewall and via a public network, the system comprising:
  a controller including a heartbeat monitor application for receiving periodic messages from the private network via the public network, the periodic messages including messages with status information about the device;
  the controller for sending a message via the public network to the private network requesting that the private network open a tunnel, and in response to the private network opening a tunnel, for providing information data to actively maintain and monitor the device, the information data being sent during a defined period of time and without using a persistent virtual private network.

26. The system of claim 25, wherein the system includes memory for maintaining status information about one or more devices on the first private network.

27. The system of claim 25, wherein the memory includes status information about devices on other private networks.

28. The system of claim 25, further comprising an appliance operatively coupled to the controller and including a virtual private network client.

* * * * *